United States Patent [19]

Zimmermann

[11] 4,024,054

[45] May 17, 1977

[54] METHOD OF SEPARATING IONIZED SUBSTANCES FROM AN AQUEOUS SOLUTION

[75] Inventor: Ulrich Zimmermann, Julich, Germany

[73] Assignee: Kernforschungsanlage Julich Gesellschaft mit beschrankter Haftung, Julich, Germany

[22] Filed: Dec. 3, 1975

[21] Appl. No.: 637,464

Related U.S. Application Data

[63] Continuation-in-part of Ser. No. 472,473, May 22, 1974, abandoned.

[30] Foreign Application Priority Data

May 23, 1973 Germany .......................... 2326224

[52] U.S. Cl. .............................. 210/18; 210/23 F; 210/44; 423/1
[51] Int. Cl.² ........................................ B01D 13/00
[58] Field of Search ............ 210/2, 18, 22 R, 23 H, 210/23 F, 37 B, 38 B, 42 R, 44, 59; 195/2, 102; 423/1, 658.5, 659

[56] References Cited

UNITED STATES PATENTS

| | | | |
|---|---|---|---|
| 3,398,088 | 8/1968 | Okey | 210/23 H |
| 3,580,840 | 5/1971 | Vridil | 210/23 F |
| 3,617,546 | 11/1971 | Li et al. | 210/23 R |
| 3,779,907 | 12/1973 | Li et al. | 210/38 B |
| 3,856,569 | 12/1974 | Strong | 210/23 F |

*Primary Examiner*—Thomas G. Wyse
*Attorney, Agent, or Firm*—Walter Becker

[57] ABSTRACT

In a method of separating ionized substances such as heavy metal ions from a mixture dissolved in aqueous solution such as sea water, lake water, waste water and the like containing at least 0.5 mM ions by means of complex formers adapted to react and enter into a combination with the substances to be separated. The method is characterized primarily by adding to the aqueous solution bubbles formed by cells of living organisms the content of which has an osmolarity differing within limitation from osmolarity of the aqueous solution. The complex formers for purposes of being received through the cells are added to a solution the osmolarity of which is lower than the cell content of the cells. The addition of the complex formers to the complex former receiving solution is contained until due to the osmosis through the cell skin acting as diaphragm, in the state of equbrium between the solution in the interior of the cells and the solution containing the complex formers, the cell content practically corresponds to the solution containing the complex formers. The osmolarity of the solution containing the complex formers is increased by adding osmotically active substances selected from the group consisting of calcium ions, potassium ions, sodium ions to the osmolarity which corresponds to the osmolarity of the cell content of the originally introduced cells. Subsequently thereto the bubbles formed by the exchange of the cell content of the cells and containing the complex formers are separated from the solution containing the complex. Thereafter the thus separated bubbles are introduced into the aqueous solution until the substance to be separated from the aqueous solution and to be ionized have moved into the interior of the bubbles through the skin of the bubbles and by the complex formers have been converted into complexes which are difficult to be disassociated or dissolved whereupon the cells are separated from the aqueous solution.

8 Claims, No Drawings

METHOD OF SEPARATING IONIZED SUBSTANCES FROM AN AQUEOUS SOLUTION

This is a continuation-in-part application based on co-pending parent application Ser. No. 472,473—Zimmermann filed May 22, 1975, now abandoned.

The present invention relates to a method for separating ionized substances such as heavy metal ions for the like which ionized substances are characterized by chemical or physical properties, from a mixture of substances dissolved in an aqueous solution such as sea water, lake water, waste water or the like and which contains at least 0.5 mM magnesium ions and/or calcium ions and potassium ions, by means of organic or inorganic complex formers or agents which aid said separation and reacting with and being able to form a complex compound with the substances to be separated.

The purpose of the method above referred to consists to make possible in an economic manner a recovery of raw materials from waters and recovery of raw materials from waste waters, especially waste waters from industry while at the same time also clearing such waste waters.

Methods of separating substances which distinguish themselves by chemical and physical properties from other ionized substances are known. Thus, for instance, a method has become known to recover metal ions from aqueous solutions by means of ion exchangers. Such methods are described for instance in U.S. Pat. No. 3,280,046; U.S. Pat. No. 3,134,740; and U.S. Pat. No. 3,354,103. The utilization of ion exchangers, however, would have inherent thereto the drawback that capacity losses occur during the operation when utilizing sea water. A rather great disadvantage in this connection consists in that the practicing of this known method will in view of the utilization of ion exchangers require complicated devices and high expenses. In addition thereto, due to the high content of salt in the sea water, the specificity for the selective ion recovery decreases during the practicing of the method.

A further heretofore known method for recovering substances from a mixture of substances in an aqueous solution, which method is utilized in particular for recovering heavy metal ions, consists in the utilization of organic solvents according to the countercurrent method. In this connection, for purposes of extraction, as solvent theonyltrifluoroaceton is used in a solution of 90% benzene and 10% tetrahydrofuran solution (J. Korkisch and K. A. Orlandini "Separation of Traces of Metal Ions from Sodium Matrices", ANL-7421 Chemistry TID- 4,500, AEC Research and Development Report). It is furthermore known as extraction substance to utilize a solution of ibutyl phosphate in a solution of butex or kerosent (R. V. Davies et al. "Extraction of Uranium from Sea Water" Nature 203, 1964, page 1110). While this method has the advantage that in this way a higher output in heavy metal ion is obtainable, it is disadvantageous that a quantitative extraction required for practicing these known methods is possible only with a pH-value of between 4 and 6. It is furthermore disadvantageous that when applying the method to heavy metal ions dissolved in sea water it is necessary to acidify the sea water because the pH-value of sea water is approximately 8. A further drawback consists in that this extraction substance is partially soluble in sea water so that losses of solvents have to be put up with which reduces the economy of the method. To these drawbacks, still another drawback has to be added, namely that after separation of the trace elements it is necessary to alkalize the sea water and to remove the dissolved organic solvents.

Finally a method for recovering metal ions from the sea water by adsorption has become known. According to this method, the uraniumtricarbonations prevalent in the sea water are adsorbed onto ion hydroxide colloids and subsequently thereto by addition of ionic detergents and by the blowing in of air are enriched on the water surface (G. Kim and H. Zeitlin "Separation of Uranium from Sea Water by Adsorbing Colloid Solution" Anal. Chem. 43, 1971, page 1390). The drawback of this method is seen in that an economic operation is possible only with a pH-value of 6.7 so that also in this instance an acidification is necesary. Moreover, this method is applicable only for the recovery of some less heavy metal ions such as the ions of uranium and molybdenum.

It is, therefore, an object of the present invention to provide a method of separating ionized substances characterized by chemical or physical properties, for an aqueous solution by means of inorganic or organic complex formers, which can be practiced in an economic manner and which also permits the utilization of low molecular complex formers in enrichment and consequently will assure a high exploitation within a relatively short time without the necessity when being applied to substances dissolved in sea water, to change the acidity of the sea water.

It is a further object of this invention to develop a method as set forth in the preceding paragraph which in case different ionized substances are contained on one solution, to separate these substances simultaneously from the solvent and from each other in a simple manner.

These and other objects and advantages of the invention will appear more closely from the following specification in connection with the example set forth further below.

The method according to the present invention is characterized primarily in that bubbles formed from cells of living organisms which contain complex formers and the content of which has an osmolarity which within limits differs from the osmolarity of the aqueous solution are added to the aqueous solution while the complex formers for being received through the cells are introduced into a solution the osmolarity of which is lower than the cell content of the cells which, if necessary after previous removal of the cell wall, are introduced into the complex former receiving a solution until due to an osmosis through the cell skin acting as diaphragm, in equilibrium condition between the solution contained in the interior of the cell and the solution containing the complex formers, the cell content practically corresponds to the solution containing the complex formers whereupon the osmolarity of the solution containing the complex formers is increased by the addition of osmotically active substances such as calcium ions, potassium ions, and sodium ions to the osmolarity which corresponds to the osmolarity of the cell content of the originally introduced cells. The method according to the invention is furthermore characterized in that subsequent to the just mentioned steps, the bubbles which contain the complex formers and which are formed by the exchange of the cell content of the cells are separated from the solution containing the complex formers and are introduced into the aqueous solution until the ionizing substances to be separated from the aqueous solution have in view of the permeability of the skin of the bubbles moved into the interior of the bubbles and have been converted by the complex formers into heavy disassociable or heavy soluble complexes, whereupon the bubbles in a further method step are separated from the aqueous solution.

The method according to the invention is based on the finding that the cell skin becomes permeable for the complex formers under consideration when the cells are introduced into a solution which has an osmolarity lower than the cell contents and the finding that the cell skin becomes non-permeable for the complex formers moved into the interior of the cell when osmotically active substances in sufficient quantity are introduced into the solution containing the complex formers. The method according to the invention is furthermore based on the finding that the cell skin becomes permeable for the substances to be separated from the aqueous solution only after the bubbles formed in connection therewith which contain the solution with the complex formers therein are introduced into a solution the osmolarity of which corresponds to the osmolarity of the original cell content of the cells. If as cells bacteria cells are utilized and it becomes necessary to remove the cell walls, according to a known method (H. R. Kaback "Bacterial Membranes, in Methods of Enzymology" Vol. 22, 1971, page 99) the bacteria cells utilized as living cells will at a temperature of from 15° to 40° be introduced into a solution the osmolarity of which is lower than the cell content of the bacteria cells while the pH-value of the solution is brought up to approximately 8, and the potassium salt of the ethylene diamini tetra acidic acid as well as lysozyn are introduced into the thus formed medium. As a result thereof, the bacteria cells lose their cell wall so that the cell content is separated from the outer medium only by the cell skin. The method according to the invention can therefore be carried out also without the utilization of cells which have a cell wall. The method is practiced in such a way that the complex formers of the solution are aided with an osmolarity which is lower than the cell content.

The method according to the invention makes it possible for the first time to employ low molecular complex formers in spite of their high solubility in sea water for economically recovering heavy metals from sea water as this is possible for instance for recovering uranium while utilizing $\beta$ hydroxy quinoline.

An advantageous further development of the method according to the invention by which the exploitation or output is incrassed further consists in that the cells are introduced into a solution with a content in osmotically active substances which is not greater than 70% of the osmotically active substance dissolved in the aqueous solution, while at least half of the substances contained in said solution consists of ions such as magnesium and/or calcium and/or potassium ions stabilizing the cell skin, whereupon after complex formers, ions, stabilizing the cell skin, and other osmotically active substances are added in such a quantity that the concentration of the total of the osmotically active substances in the solution containing the complex formers differs not more than 20% from the concentration of the osmotically active substances contained in the aqueous solution, while the cells are kept in the solution for a period of from one to two hours. It is expedient that the exchange of the cell content with the solution containing the complex formers is carried out at 0°C. In order to separate a plurality of substances simultaneously from the aqueous solution, it has proved advantageous to add to the aqueous solution bubbles with respective complex formers suitable for one of the substances to be separated from the mixture of substances in the aqueous solution and to do this at time intervals or in locally spaced arrangement. The separation of the bubbles from the aqueous solution may be effected in different ways. However, it is expedient that the bubbles are separated from the aqueous solution by flotation, sedimentation, filtration, or centrifuging. The method according to the invention is very suitable not only for recovering substances but also for separating impurities from waste waters.

Example

Erythozytes were introduced into a tris-solution with a ph-value of 7.2 while a suspension density of the erythozytes of 40g% was adjusted in the solution. To 50 ml of this solution, were added 500 ml of a solution which contained 5 mM/1 $MgSO_4$ and $10^{-4}$ Mol/1 dimethylglyoxim. The thus produced solution was held at 0°C for a period of thirty minutes subsequently thereto, the osmolarity of the solution was adjusted to the osmolarity of the original tris while a suitable quantity of a solution was added which contained 155 mM/1 a NaCl. Simultaneously, the temperature of the solution was increased to 37°C, and this temperature was maintained for a period of 50 minutes. The bubbles containing the dimethylglyoxim were then centrifuged off in a centrifuge at 30,000g.

The centrifuged off bubbles were than added to 100 ml of an isotone tris solution with a ph-value of 7.5 which contained $10^{-4}$ Mol/1 Ni. After the bubbles had been left for approximately 30 minutes in the solution containing the Ni to be separated, the bubbles were separated by centrifuging. An analysis of the nickle concentration in the remaining solution indicated an enrichment of the nickle by more than a tenth power.

To clarify what is to be understood from the wording "complex formers", there is noted that the complex formers enter into compounds or compositions with materials characterized by way of physical and chemical characteristics. The following paragraphs will set forth more clearly the meaning of such terminology. Complex formers are also called masking means, and such complex formers are chemical materials which are used for formation of coordination compositions or compounds with respect to ions located together therewith in a solution. Complex formers as well as utilization thereof are known to every man skilled in the art. So, there is known for example that through introduction or insertion of complex formers there can be ions so bound in a solution that the ions do not disturb the evidence, detection or analysis of other ions likewise existing in the solution. Accordingly there exists also the designation "masking" for the occurrence or entry of these compositions. Organic compositions primarily or most of all are utilized as complex formers (or masking means) (for formation of Chelat complexes) as well as fluoride and cyanide which are also used for such purposes. The utilization of complex formers or masking means is an important aiding means for quantitative evaluation of a type of ion and analytic chemistry whereby there is not necessary any analytic separation of the ions.

From the foregoing representations there can be recognized that the complex formers enter into composition selectively with predetermined ions which means that they enter into composition with "material characteristically and notably ionized by way of chemical or physical characteristics". The description for the present invention permist recognition that the concern with these materials involves those which differ by way of chemical or physical characteristics as to others, particularly those from which the same are to be separated.

Since accordingly as apparent from the foregoing statements, the complex formers as well as the utilization therof for the average man skilled in the art can be preconditioned as being known.

There can also be preconditioned that an average man skilled in the art who receives the teaching given by way of the present invention knows the complex formers must be used or inserted for separation of predetermined ions out of an ion mixture. Consequently and to this extent, the teaching of the present invention pertains to separation of all substances which can be bound by way of utilization of complex formers.

Complex formers so far as is known in English terminology can be referred to as "chelating agents", and the coordination compounds or compositions formed thereby are designated as "complex compounds". For clarification of the teaching given by the present invention, there can be given additional comments as set forth in the following paragraphs.

The method according to the present invention consists therein that complex formers or "chelating agents" which are embodied respectively according to the type of ions to be separated become introduced into cells of live or living things by utilization of osmotic forces in that the cells lose the content thereof by interchange of such cell content with the solution containing the complex formers or "chelating agents", whereupon the damage effected by way of the effect of the osmotic forces in the bubbles formed out of the cells by way of interchange of the cell content becomes healed again by way of addition of osmotic active materials in the cell-containing solution. The method according to the present invention accordingly consists therein that the bubbles formed by way of the aforementioned method steps and that now enclose or encompass the complex formers become given directly into the water solution which contains the ions to be separated. These ions to be separated then wander through the skin of the bubbles into the inside or interior thereof and become transformed by way of the complex formers or "chelating agents" located in the bubbles into difficult to dissociate or difficult to dissolve complex compounds—coordination compounds—so that the same no longer can come out of the bubbles, and the same become separated by way of removal of the bubbles out of the watery solution.

The teaching conveyed to the average man skilled in the art with the inventive disclosure to form the bubbles out of such cells of living things of which the content possesses an osmolarity or osmotic capability which diverges in limits from the osmolarity of the watery solution will be understood by the average man skilled in the art for whom there is known the transporting procedure required by osmosis through membranes such that the osmolarity in the cells of osmolarity of the watery solution can be permitted to diverge only so far as the cells do not become destroyed by way of the osmotic pressure arising during carrying out of the method in accordance with the teaching of the present invention. The teaching of the present invention includes statements about the limits in which the osmolarity of the cell content differs from the osmolarity of the watery solution. Moreover, the teaching given by way of the present invention includes how far the same pertains to embodying of the method according to the present invention setting forth more accurate statements about the individual limits. These statements consist therein that the cells are introduced into a solution of which the content as to osmotic active materials is not greater than 70% of the osmotically active materials dissolved in the watery solution and that after addition of osmotic active materials, the concentration of the entirety of osmotic active materials in the solution containing complex formers or "chelating agents" and accordingly also after interchange of the cell content with the solution containing the complex formers, the concentration of osmotic active materials inside the bubbles should not diverge or depart more than 20% from the concentration of the osmotic active materials contained in the watery solution.

For formation of bubbles containing the complex formers or "chelating agents" there are useable all cells of living things which can be introduced into a solution by way of the teaching of the present invention and of which the cell content can be interchanged by way of a solution containing complex formers of "chelating agents", which means all cells of living things with initially unchanged cell content and undamaged cell skin. During the carrying out of the method according to the present invention, there becomes utilized thereby a characteristic existing with all such cells, namely that the permeability of the cell skin is changeable by way of osmotic procedure or steps and subsequently is again healed or capable of being healed. Conseuqently, there is noted that also all bacteria cells are useable for carrying out the method in accordance with the present invention. Thereby there is self-understood without having to set forth in any greater detail than an average man skilled in the art primarily will use such cells of living things for carrying out the method in accordance with the present invention which are available to the average man skilled in the art in sufficient quantity and being as inexpensive as possible.

Three U.S. references show the state of the art involving methods in no way related to the teaching of the method of the present invention. Moreover, the concern with the cited known methods involves materials being separated out of a solution, namely phosphor (U.S. Pat. No. 3,398,088—Okey), organic and inorganic impurities (U.S. Pat. No. 3,580,840—Uridil) and phenol from waste water (U.S. Pat. No. 3,617,546—Li et al). Semipermeable membranes for separation of different solutions and for selective transporting of predetermined substances also become utilized. From none of the references, however, is there even any showing or suggestion provided as to the utilization of cells of living things which would provide basis for deriving or suggesting the teaching of the present invention.

The method according to the invention indisputably is novel, an advance and inventive over what has been considered and known previously.

There exists the interchange of the concept expressed by the wording "complex formers" to be compared with the concept "chelating agents". The concern herewith involves a clarification which is necessary because apparently the concept "complex former" is not conventional in the U.S. practice or American language usage and accordingly the wording must be replaced by way of a suitable concept. That this is the case should be proven thereby according to belief of applicant that in the German language used in the German priority document P 23 26 224.0 filed May 23, 1973 the concept of "complex formers" as used therein should become translated better by way of the wording "chelating agents". The German word "Komplexbildner" can be translated into English as "complexing agents" according to a German-English dictionary. The concept "chelating agents" is that noted; moreover, the term "chelating" (Chelaten) must be understood to mean complex connections or compositions of organic type so apparently the concept "chelating agents" should be subordinate concept with respect to "complexing agent". No further statements should be necessary, that the concept "complex formers" (Komplexbildner) in the German language usage is understandable for every average man skilled in the art.

An average man skilled in the art on the basis of the concept "complex formers" would be in a position to recognize which materials are to be used as complex formers or whether a complex former is a particular material or not. As a matter of example from the first paragraph of the present description, there is set forth clearly and unequivocally that there are organic and inorganic complex formers and that the concern accordingly involves chemical compounds which react or are in a position to enter into connections or compounds with the materials to be separated particularly such materials to be separated such as heavy metal ions and the like. Subsequently in the U.S. description there is set forth the statement that upon carrying out the method according to the invention the materials to be separated become transformed by way of the complex former into a difficult to dissociate or difficult to dissolve complex means. Additionally, in the sample embodiment there has been noted as such as complex former specifically dimethylgloxim which enters into a compound or connection difficult to dissolve with nickel ions.

Accordingly for an average man skilled in the art there can exist no doubt whatever that the concern with complex formers involves chemical materials which become used for formation of coordination compounds with ions located in a solution. Such chemical materials are, however, known to every average man skilled in the art.

The U.S. text does provide basis according to which bacteria cells are to be selected which are to be used during carrying out the method in accordance with the present invention. Further criteria of selection for bacteria cells for use of the same upon carrying out the method according to the present invention also would not be necessary. From the descriptive text, there is set forth in an ascertainable manner much more that upon carrying out the method according to the present invention the concern involves a characteristic primarily with respect to the utilized bubbles, particularly the characteristic that the skin of the bubbles is semipermeable. This, however, is a characteristic of all cells of living things. From the U.S. text description, there can be found to be set forth additionally that the method according to the invention is based upon recognition that the cell skin of all cells of living things can be made permeable by application of osmotic pressure and subsequently can be made semi-permeable again. This characteristic, which all cells of living things have, has been utilized with the teaching of the present invention. If bacteria cells are used, so only the cell wall additionally needs to be removed thereby.

Objection may be raised that the formulation of wording "ionized substances . . . which . . . are characterized by chemical or physical properties" would take into consideration that all ionized materials could be separated out of a watery or aqueous solution upon utilization of the method in accordance with the present invention. In the present description in connection with the teaching according to the invention, there is set forth in a manner that cannot be misunderstood that the concern hereby involves such ionized materials which are transformed through complex formers into complex compounds which are difficult to dissociate or difficult to dissolve. Which materials could be transformed by way of complex formers into such complexes is known to the average man skilled in the art. This also is not the teaching of the present invention. The teaching of the present invention is much more the teaching as to the manner in which such complex formers are to be handled in order to apply or install the same for separation of ionized material in watery or aqueous solution. This teaching has been given in an unmistakable manner and there should not be any misunderstanding with respect thereto.

There is adequately specified within which boundaries the osmolarity of the concept of the bubbles diverges from the osmolarity of the watery or aqueous solution. Moreover, the cells are entered into a solution relative to which complex formers are first added and then such a quantity of ions having a stabilizing effect as to the cell skin, and additional osmotic active materials are added so that the concentration of the total of the osmotic active materials contained in the complex forming solution does not diverge anymore than 20% from the concentration of the osmotic active materials contained in the watery or aqueous solution. Since the content of the bubbles according to the carrying out of the method in accordance with the present invention corresponds to the solution containing the complex formers, there is fixed thereby also the osmolarity of the content of the bubbles in the boundary or limits ranging from $0 \pm 20\%$ of the osmolarity of the watery or aqueous solution.

In the sample embodiment no statements have been made as to the matter of within which boundaries or limits the osmolarity of the cntents of the bubbles diverges from the osmolarity of the watery or aqueous solution. This is correct. Attention is directed thereto that in the sample embodiment the disclosure proceeds on a basis that a time isotone solutions are turned up or set. Moreover, in the present description there is mention made only as to a "tris-solution". Since, however, the concern involves the solution in which the erythozyte becomes stored up, every man skilled in the art knows that the concern here must involve such an isotope solution. Since the concern with the statements as to the limits or boundary as to the osmolarity involves tolerance range or breadth in which the method according to the invention is applicable, there is believed not necessary also to set forth these limits in the sample embodiment. Meaningful is only that the tolerance breadth is disclosed in the present disclosure.

This, however, is the case as must be taken to be without double meaning according to the foregoing statements and comments.

The foregoing paragraphs should clarify what is to be understood when referring to complex formers, or complexing agents, and chelating agents.

For clarification of the method in accordance with the present invention, the following individual method steps are set forth separately:

a. There is to be proceeded on the basis of suspendable cells of living things having content thereof surrounded only by the cell skin which as an osmolarity which differs in limits from the osmolarity of the aqueous solution containing the materials to be separated.

b. The cells become introduced into a solution of which the osmolarity is smaller than the osmolarity of the cell content.

c. The solution into which the cells become introduced (or have become introduced) and complex formers or chelating agents added thereto.

d. The cells are left so long in the solution containing the complex formers or chelating agents until as a consequence as materials interchange through the cell skin effective as a membrane so that there exists an equilibrium condition between the solution contained in the cell interior and solution containing the complex former or chelating agent corresponding practically to the solution containing the complex former or chelating agent as to the cell content.

e. Subsequent thereto, the osmolarity of the solution containing the complex formers or chelating agent (and the bubbles so formed) becomes increased by way of addition of osmotically active materials such as calcium-ions, potassium, sodium-ions being raised to the osmolarity of the cell content of the cells originally introduced (and accordingly in limits raised to the osmolarity of the aqueous solution).

f. The formed bubbles become separated from the solution containing the complex formers or chelating agents.

g. The bubbles become inserted into the aqueous solution which contains the materials to be separated and the same are left therein so long until the ionized materials to be separated from the aqueous solution have wandered into the inside of the bubbles as a consequence of the permeability of the skin of the bubbles and have become transformed by way of the complex formers or chelating agents into compounds difficult to dissolve or difficult to dissociate.

h. The bubbles thereupon become separated from the aqueous solution.

Under the sub paragraph (a) there has been set forth in a clarified manner that it is proceeded on the basis of cells of living things which are suspandable in a solution.

These are all cells of livings things which as already in the natural condition thereof are suspended in a physiological fluid or liquid as for example, Drythrozyten or Leukozyten in blood or micro-organisms in the feeding medium or which are suspandable by way of the utilization of a corresponding method in physiological fluid or liquid. There becomes preconditioned as self understood thereby that cells of living things can be held only in physiological solutions. Such a physiological solution is, however, the aqueous solution in accordance with introductory wording and containing at least 0.5 mM/1 magnesium and also calcium as well as Kalium-ions.

For clarification that for the method according to the present invention entirely generally cells of living things are usable without specification being necessary beyond what is set forth in sub paragraph (a) in the foregoing there can be attention directed thereto that with the method steps (a) through (f) the concern primarily is to create formations which are surrounded on all sides by a semi-permeable membrane whereby within this membrane, the complex formers are enclosed. Thereby there becomes utilized the known characteristic of living cells of living things that the skin thereof is semi-permeable. The disclosure of certain of the preceding paragraphs pertain to this subject, including particularly a poine 3 included therewith. As a further clarification to set forth what should be understood with such formations, there can be reference made to membrane vesicul in place of the concept "bubbles".

In the present description, attention is directed further thereto that the measure set forth in sub paragraph (a) that that the osmolarity of the cell content diverges in limits from the osmolarity of the aqueous solution sets forth nothing more than that the osmolarity can be permitted to diverge only so far from the osmolarity of the aqueous solution such that the cells do not become destroyed during carrying out of the method.

This point was noted previously in the preceding paragraphs. The following additional sample embodiments are also being incorporated in this description to provide basis for recognition of the broad teaching involved with the present invention.

Sample Embodiment No. 2

As cells, there become used "Dunaliella" algae which became cultured in a solution having contents in accordance with the following listing of material quantities:

1.5 M/1 NaCl, 24 mM/1 $MgSO_4$, 20 mM/1 $MgCl_2$, 10 mM/1 $CaCl_2$, 4 nM/L $NaNO_3$, 1 mM/1 $KNO_3$, 0.1 mM/1 $K_2HPO_4$, 1.5 uM/1 $FeCl_3$, 30 uM/1 EDTA,185 uM $H_3BO_3$, 7 uM $MnCl_2$, 0.8 uM/1 $ZnCl_2$, 0.02 uM/1 $CoCl_2$, 0.2 uM/1 $CuCl_2$ and 20 mM/1 Tris-Cl.

The pH-Value of the solution amounts to 7.4

The bubbles containing complex formers become formed thereby that the algae with a suspension density of approximately $10^8$ cells/ml become given in a solution of which Mol/1 NaCl (sodium chloride) having osmolarity thereof reduced to 0.45 mol/1 by way of addition is distilled water. There becomes added to the solution 20 mM/1 sodium phosphate as a complex former or chelating agent as to the solution for binging of lithium. The temperature of the solution thereby amounts to 15° C. After 20 minutes, the solution becomes brought to the osmolarity of the starting solution by way of addition of sodium chloride and a small quantity of calcium (approximately 2.0 mM/1). After a further 20 minutes, the bubbles become centrifuged off.

For separating of lithium out of an aqueous solution, the bubbles are given into a flow or an aqueous solution which contains 1 M/1 NaCl sodium chloride and 10 mM/1 lithium. The bubbles are left approximately two through three days in the aqueous solution. The enrichment factor determined as a consequence thereof for theenrichment of lithium in the bubbles referring to the concentration of lithium in the aqueous solution becomes determined at $10^3$.

Sample Embodiment No. 3

"Dunaliella" algae according to sample embodiment 2 become used as cells. The formation of the bubbles and the separation of lithium from the aqueous solution becomes carried out as with the sample embodiment 2. As a difference with respect to the sample embodiment 2, there is noted that the solution contains sodium phosphate that becomes added again as a complex former or chelating agent, through 2.0 M/l sodium chloride NaCl relative to which the osmolarity becomes increased again also after formation of the bubbles.

The aqueous solution from which lithium becomes separated contains in any event 2.0 M/l sodium chloride as well as 10 mM/l lithium. The resulting enrichment factor for lithium amounts to approximately $10^3$ as with the sample embodiment 2.

Sample Embodiment No. 4

As cells there are "Dunaliella" algae used according to sample embodiment 2. The formation of the bubbles in which sodium phosphate becomes introduced as a complex former or chelating agent occurs as with the sample embodiment 2 in a solution containing 1.0 M/l sodium chloride. After formation of the bubbles, these become introduced into sea water for separation of lithium with the sea water containing 430 mM/l NaCl, 50 mM/l Mg, 9.5 mM lKCl, 10 mM/l CaCl, 2 uM/l Lithium as well as 0.03 uM/l uranium. The resulting enrichment factor for lithium also in this case amounts to $10^3$.

Sample Embodiment No. 5

As cells there are used again "Dunaliella" algae according to the sample embodiment 2. The formation of the bubbles occurs as with the sample embodiment 3 in a solution which contains 2.0 M/l sodium chloride which, however, becomes added 10 mM/l sodium sulphate as a complex former or chelating agent for separation of barium.

The formed bubbles become introduced into an aqueous solution containing 2.0 mM/l sodium chloride and 10 mM/l barium for separation of barium. The procedure occurs corresponding to the sample embodiment 2. The resulting enrichment factor for barium in the bubbles amounts to approximately 50.

Sample Embodiment No. 6

As cells there become used "Dunaliella" algae according to sample embodiment 2. The formation of the bubbles occurs as with the sample embodiment 2, in a solution which contains 1.0 M/l sodium chloride which, however, has 10 mM/l sodium citrate added as complex former or chelating agent for separation of uranium.

The formed bubbles become added for separation of uranium in sea water as to the composition according to sample embodiment 4 and the method procedure for separation of uranium according to the sample embodiment 2. The resulting enrichment factor for uranium in the bubbles amounts to approximately $10^5$.

It is, of course, to be understood that the present invention is, by no means, limited to the example but also comprises any modifications within the scope of the appended claims.

What I claim is:

1. In combination for a method of separating metal ions from a mixture which is dissolved in an aqueous solution such as sea water, lake water, waste water and the like containing at least 0.5 mM ions selected from the group consisting of magnesium ions, calcium ions, and potassium ions, by means of complex formers adapted to react and enter into a combination with the substances to be separated, the improvement therewith including steps of: adding to the aqueous solution bubbles formed by cells of living organisms the content of which has an osmolarity differing within limits from the osmolarity of the aqueous solution, said complex formersfor purposes of being received through said cells being added to a solution the osmolarity of which is lower than the cell content of said cells, continuing said addition of said complex formers to said complex former receiving solution until due to said osmosis through the cell skin acting as diaphragm, in the state of equilibrium between the solution in the interior of the cells and the solution containing the complex formers of the cell content practically corresponds to the solution containing the complex formers, increasing the osmolarity of the solution containing the complex formers by adding osmotically active substances selected from the group consisting of calcium ions, potassium ions and sodium ions to the osmolarity which corresponds to the osmolarity of the cell content of the originally introduced cells, subsequently separating the bubbles formed by the exchange of the cell content of said cells and containing said complex formers from the solution containing said aqueous solution until the substances to be separated from said aqueous solution and to be ionized have due to the permeability of the skin of said bubbles moved into the interior of said bubbles and by said complex formers have been converted into complexes which are difficult to be disassociated or dissolved, and separating said cells from said aqueous solution.

2. A method in combination according to claim 1, which includes the step of removing the cell wall prior to adding said complex formers to the pertaining solution.

3. A method in combination according to claim 1, which includes the step of introducing as bacteria cells used as living cells at a temperature of between 15° and 40° C into a solution the osmolarity of which is lower than the cell content of the bacteria cells while the pH-value of the solution is brought up to 8, and adding to the thus formed medium the potassium salt of the ethylene diamine tetra acid and lysozym.

4. A method in combination according to claim 1, which includes the steps of introducing the cells into a solution with a content in an osmotically active substance which amounts at a maximum to 70% of the osmotically active substance dissolved in said aqueous solution while at least one half of the substances contained in said solution will be ions selected from the group consisting of magnesium ions, calcium ions, and potassium ions stabilizing the cell skin, adding to said solution complex formers, said cell skin stabilizing ions and other osmotically active substances being added in such a quantity that the concentration of the total of the osmotically active substances in the solution containing the complex formers differs by a maximum of 20% from the concentration of the osmotically active substances in said aqueous solution, and keeping the cells in said solution for a time period of from one to two hours.

5. A method in combination according to claim 4, to which the exchange of the cell contents with the solution containing the complex formers is carried out at 0° C.

6. A method in combination according to claim 1, which includes adding to the aqueous solution bubbles with a complex former suitable for one of the substances to be separated from the mixture of substances in the aqueous solution and to do so at time intervals.

7. A method in combination according to claim 1, which includes adding to the aqueous solution bubbles with a complex former suitable for one of the substances to be separated from the mixture of substances in the aqueous solution and to do so in locally separated guiding means.

8. A method in combination according to claim 1, which includes the step of separating the bubbles from the aqueous solution by a separating operation selected from the group consisting of flotation, sedimentation, filtration and centrifuging.

* * * * *